US012664524B1

(12) United States Patent
Scheibelhut et al.

(10) Patent No.: US 12,664,524 B1
(45) Date of Patent: Jun. 23, 2026

(54) SMART CART ISSUE PREDICTION WITH REMEDIAL WORKFLOW

(71) Applicant: Maplebear Inc., San Francisco, CA (US)

(72) Inventors: Brent Scheibelhut, Toronto (CA); Naval Shah, Toronto (CA); Mark Oberemk, Toronto (CA); Charles Wesley, San Diego, CA (US); Michael John Remmer Ryzewic, Ithaca, NY (US); Hua Xiao, Toronto (CA)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/999,246

(22) Filed: Dec. 23, 2024

(51) Int. Cl.
| | |
|---|---|
| *G06Q 50/10* | (2012.01) |
| *G06Q 10/20* | (2023.01) |
| *G06T 7/00* | (2017.01) |
| *G01G 23/01* | (2006.01) |

(52) U.S. Cl.
CPC .......... *G06Q 10/20* (2013.01); *G06T 7/0002* (2013.01); *G01G 23/01* (2013.01); *G06T 2207/20081* (2013.01)

(58) Field of Classification Search
CPC ................. G06Q 10/20; G06T 7/0002; G06T 2207/20081; G01G 23/01
See application file for complete search history.

(56) References Cited

U.S. PATENT DOCUMENTS

| | | | | |
|---|---|---|---|---|
| 2020/0393831 A1* | 12/2020 | Kim | ..................... | G05D 1/0221 |
| 2022/0026920 A1* | 1/2022 | Ebrahimi Afrouzi | ....................... | |
| | | | | G06N 3/0495 |
| 2022/0187841 A1* | 6/2022 | Ebrahimi Afrouzi | ....................... | |
| | | | | G05D 1/0272 |
| 2023/0214925 A1* | 7/2023 | Cella | ..................... | G06Q 30/06 |
| | | | | 705/37 |

FOREIGN PATENT DOCUMENTS

| | | | | | |
|---|---|---|---|---|---|
| JP | | 2020178528 A | * | 10/2020 | ........ H04M 1/72412 |

OTHER PUBLICATIONS

A. K. Gupta et al., "Monitoring and Predictive Maintenance using Machine Learning for Industrial Machine," 2024 2nd International Conference on Self Sustainable Artificial Intelligence Systems (ICSSAS), Erode, India, 2024, pp. 402-407, doi: 10.1109/ICSSAS64001. 2024.10760557 (Year: 2024).*
L. D. Donato et al., "A Survey on Audio-Video Based Defect Detection Through Deep Learning in Railway Maintenance," in IEEE Access, vol. 10, pp. 65376-65400, 2022, doi: 10.1109/Access. 2022.3183102 (Year: 2022).*

* cited by examiner

*Primary Examiner* — Dipen M Patel
(74) *Attorney, Agent, or Firm* — Fenwick & West LLP

(57) ABSTRACT

An online system leverages a cart issue prediction model trained as a machine-learning model to identify predicted issues with the operation of a smart cart based on sensor data captured by sensors on the smart cart and/or feedback from a user of the smart cart. The machine-learning model is trained on historical data related to the operation of a fleet of (Continued)

smart carts. In response to identifying any cart issues, the online system can trigger a remedial workflow to remedy the predicted issues. The online system may transmit command signals to the smart cart to calibrate the sensors, may transmit remedial tasks to a client device of the user for prompting the user to aid in remedying the predicted issues, or may schedule a service appointment with a technician, including an issue report indicating the predicted issues.

19 Claims, 6 Drawing Sheets

Cart Issue Prediction
500

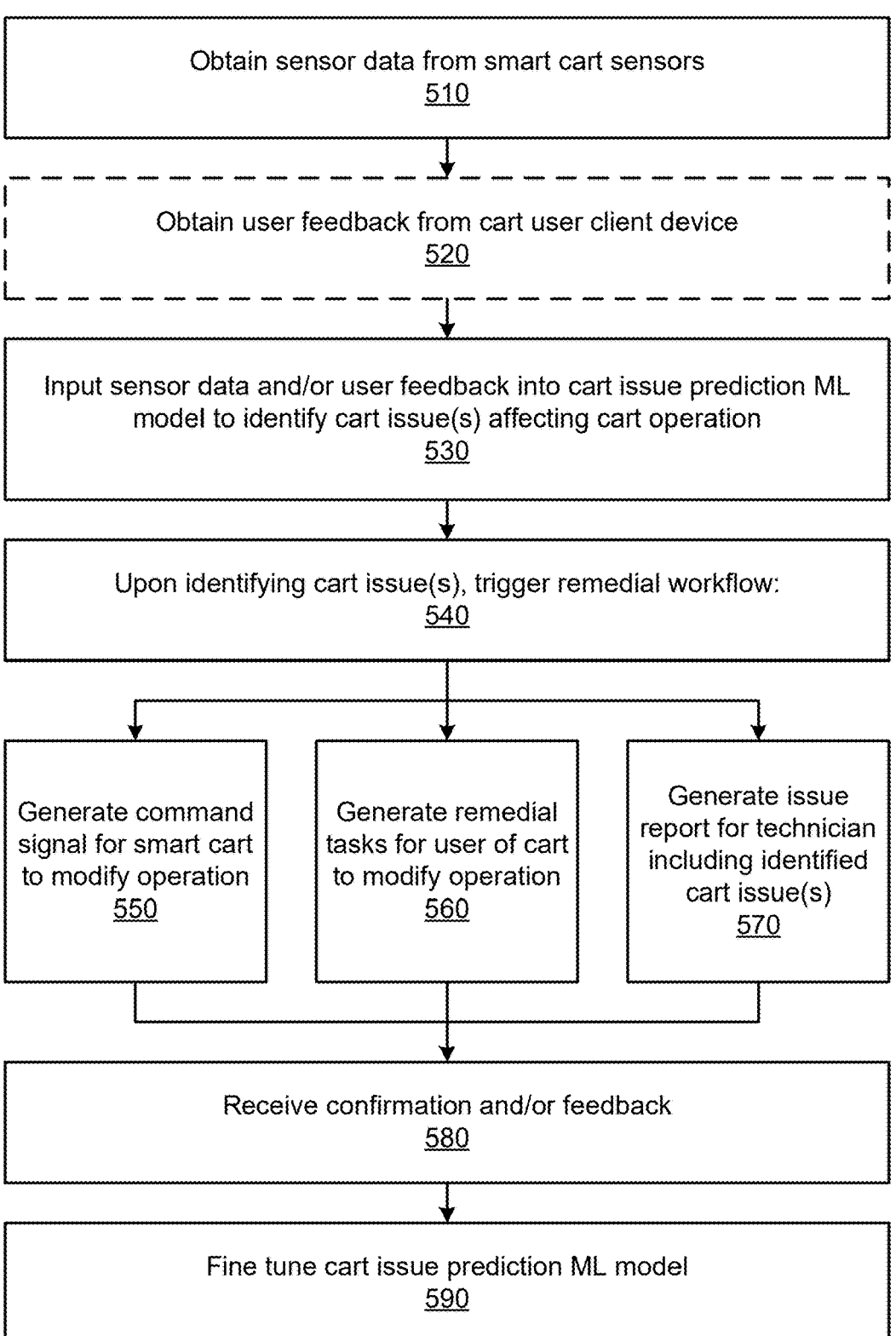

Obtain sensor data from smart cart sensors
510

Obtain user feedback from cart user client device
520

Input sensor data and/or user feedback into cart issue prediction ML model to identify cart issue(s) affecting cart operation
530

Upon identifying cart issue(s), trigger remedial workflow:
540

Generate command signal for smart cart to modify operation
550

Generate remedial tasks for user of cart to modify operation
560

Generate issue report for technician including identified cart issue(s)
570

Receive confirmation and/or feedback
580

Fine tune cart issue prediction ML model
590

FIG. 5

SMART CART ISSUE PREDICTION WITH REMEDIAL WORKFLOW

BACKGROUND

Smart carts are currently being developed, which are implemented with technology to aid users during an in-store visit.

Carts are prone to wear and tear over time. For example, a cart's wheels can become stuck or clogged, increasing friction in the wheel movement, rendering the cart harder to push and/or turn. Moreover, with the advent of smart carts and their suite of sensors, those sensors are also prone to malfunction and falling out of calibration, resulting in increased opportunities for inoperability of the smart cart compared to the non-smart counterparts. Traditionally, with non-smart carts, human operators would need to recurrently assess the operability of the non-smart carts to ensure cart operation within tolerance. Even with smart carts, human technicians would, ordinarily, have to test mobility of the cart and/or operability of the cart's sensors. All these challenges amount to technological problems in the implementation of smart cart technology.

SUMMARY

A smart cart uses one or more sensors to capture data relating to the operation of the smart cart. The smart cart may include camera(s), load sensor(s), item scanner(s), location sensor(s), wheel sensor(s), or some combination thereof. The camera(s) can capture image data of the items in the cart. The load sensor(s) can measure load data indicating a total load of items in the cart. The item scanner(s) can capture unique item identifiers to differentiate between items. The location sensor(s) can track position information or motion of the cart. The wheel sensor(s) can track rotation and/or orientation of the wheels to aid in determining the position or motion of the cart. Based on the sensor data, the cart can detect the items that were obtained.

An online system leverages a cart issue prediction model trained as a machine-learning model to identify issues with the operation of a smart cart based on sensor data captured by sensors on the smart cart and/or feedback from a user of the smart cart. The machine-learning model is trained on historical data related to the operation of a fleet of smart carts. In response to identifying any cart issues, the online system can trigger a remedial workflow to remedy the identified issues. The online system may transmit command signals to the smart cart to calibrate the sensors, may transmit remedial tasks to a client device of the user for prompting the user to aid in remedying the issues, or may schedule a service appointment with a technician, including an issue report indicating the identified issues.

Leveraging the cart issue prediction model yields a technological improvement in that issues in mechanical, electrical, and computing systems, such as those in a smart cart, can be detected as they arise through captured sensor data, rather than waiting for infrequent evaluations by human operators. Moreover, the online system can automatically trigger remedial actions to remedy issues uniquely identified per smart cart. Therefore, the described cart issue prediction model is an improvement to the technical field of maintaining mechanical, electrical, and computing systems by leveraging machine-learning technology to analyze sensor data to predict the occurrence of issues in these systems.

BRIEF DESCRIPTION OF THE DRAWINGS

FIG. 5 is a method flowchart describing the process of cart issue prediction and/or remediation, in accordance with one or more embodiments.

DETAILED DESCRIPTION

Online System Environment

Figure 1A:
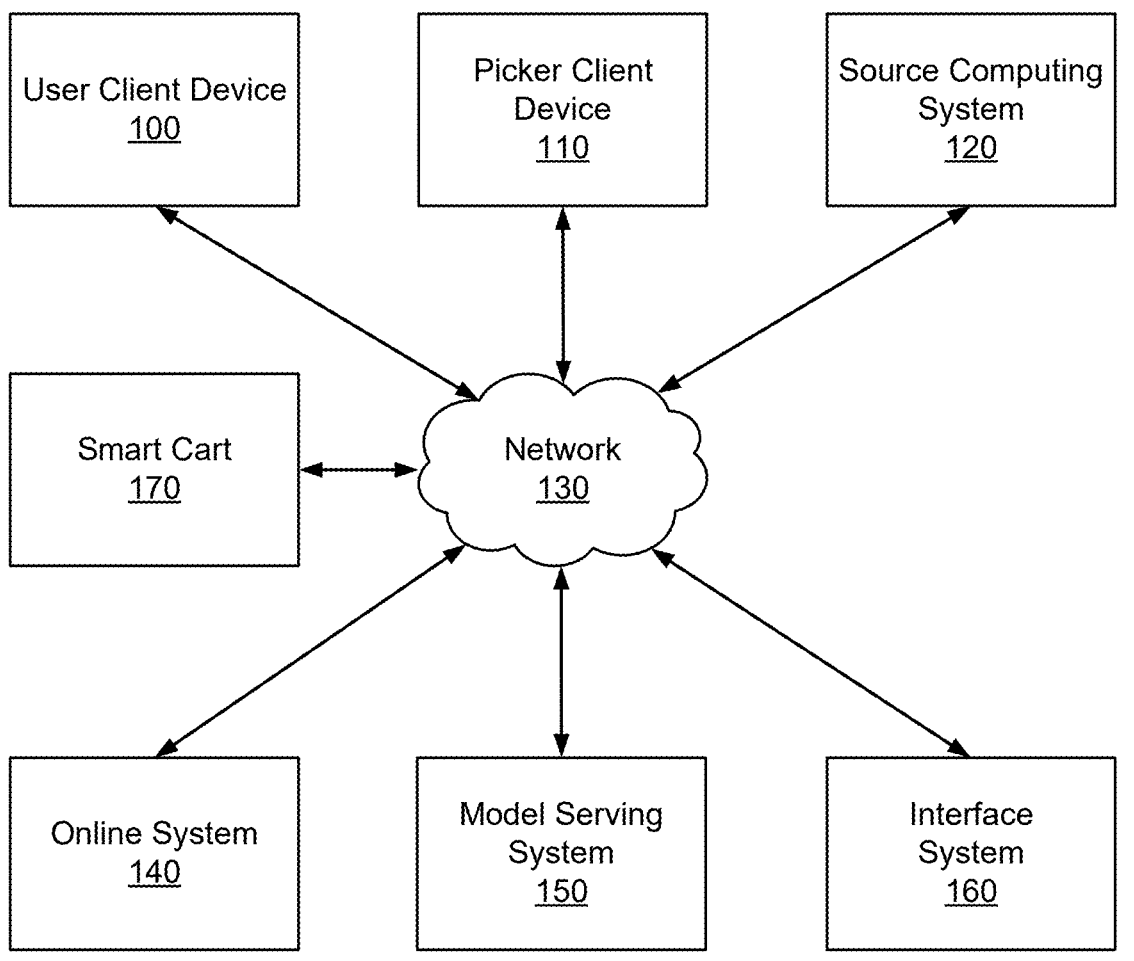
FIG. 1A illustrates an example system environment for an online system, in accordance with one or more embodiments.

FIG. 1A illustrates an example system environment for an online system 140, in accordance with one or more embodiments. The system environment illustrated in FIG. 1A includes a user client device 100, a picker client device 110, a source computing system 120, a network 130, an online system 140, a model serving system 150, an interface system 160, and a smart cart 170. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

As used herein, users, pickers, and stores may be generically referred to as "users" of the online system 140. Additionally, while one user client device 100, one picker client device 110, one source computing system 120, one smart cart 170 are illustrated in FIG. 1, any number of client devices, stores, or smart carts may interact with the online system 140. As such, there may be more than one user client device 100, more than one picker client device 110, more than one source computing system 120, or more than one smart cart 170.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. A user may also be referred to as a user that provides orders to the online system 140 for fulfillment. An order specifies a set of items to be delivered to the user. An "item", as used herein, means a good, a product, or a service that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more stores from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140. To perform a search, the user provides a query (e.g., a text query, an audio query, or a visual query) to the online system 140. The online system 140 processes the query to return query results to the user. Based on the displayed results, the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected. The user interface may also include options to provide input for user preferences. For example, the user may, via the user interface, provide input tagging one or more items as favorite items. In another example, the user may, via the user interface, provide input (e.g., in the form of user feedback or user messages) to past orders.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online system 140.

The picker client device 110 receives orders from the online system 140 for the picker to service. A picker may also be referred to as a picker that fulfills orders by the user. Items in the order may be presented in a particular sequence (i.e., display order) to optimize efficiency of the picker. A picker services an order by collecting the items listed in the order from a store. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the store, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the source location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

The picker client device 110 may also provide a communication interface to the picker, e.g., to communicate with another user of the online system 140. For example, the communication interface of the picker client device 110 may present messages from a user client device 100 to the picker client device 110. Such communication may be utilized when items in an order are unavailable at the source location. In such scenarios, the picker may query the user for suitable substitution items to be obtained for the unavailable item. The messages may be in the form of text, audio, pictures, other digital manners of communicating information, etc.

In one or more embodiments, the picker is a single person who collects items for an order from a source location and delivers the order to the delivery location for the order. Alternatively, more than one person may serve the role as a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

The source computing system 120 is a computing system operated by a store that interacts with the online system 140. As used herein, a "store" is an entity that operates a "source location," which is a store, warehouse, or other building from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The source computing system 120 may provide the online system 140 with store data describing the store associated with the source computing system 120. The store data may include store name, store address, store website, store phone number, other identifying information, a type of store, an expense class of the store (e.g., $, $$, or $$$), opening hours, general dependability of items, diversity of items, types of items carried, or information describing the store, or some combination thereof. The online system 140 may further infer additional store data based on interactions between users or pickers and the store. For example, such store data based on the interactions may include user reviews, picker reviews, popular items ordered, dependability of items, etc.

In one or more embodiments, the source computing system 120 may aid in management of one or more smart carts 170 operated within the store environment. The source computing system 120 may maintain logs and records on the smart carts 170 deployed. For example, the source computing system 120 may maintain logs of the sensor data captured by sensors of the smart cart 170. The source computing system 120 may also store service records of the smart cart 170.

In one or more embodiments, the source computing system 120 may include a cart tracking system for tracking locations of smart carts throughout the in-store environment. In one or more embodiments, the cart tracking system may implement sensors positioned around the in-store environment and/or sensors coupled to the smart carts. In embodiments with sensors positioned around the in-store environment, the sensors may wirelessly communicate with counterpart device(s) on the smart carts to determine a location of each smart cart. In embodiments with sensors coupled to the smart carts, the sensors may wirelessly communicate with counterpart device(s) positioned around the in-store environment to determine a location of each smart cart. For example, the sensors may communicate with radiofrequency identifier (RFID) tags to triangulate a position of the sensors and/or the RFID tags. In one example, each smart cart includes a RFID reader as the sensor which receives signals from RFID tags positioned around the in-store environment. Based on the received signals, the tracking system can triangulate a position of the smart cart. In another example, each smart cart includes an RFID tag and RFID readers positioned around the in-store environment can read the signal from the cart's RFID tag to triangulate a position of the smart cart. In other embodiments, each smart cart may include additional components to aid in locating the smart cart in the in-store environment, including: wheel sensor(s), accelerometer(s), inertial measurement unit(s), magnetometer(s), imaging device(s), inclinometer(s), etc. Additional description relating to cart tracking is described in U.S. application Ser. No. 17/873,526 filed on Jul. 26, 2022, which is incorporated by reference in its entirety.

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a store. The online system 140 receives orders from a user client device 100 through the network 130. The online system 140 selects a picker to service the user's order and transmits the order to a picker client device 110 associated with the picker. The picker collects the ordered items from a source location and delivers the ordered items to the user. The online system 140 may charge a user for the order and provide portions of the payment from the user to the picker and the store.

As an example, the online system 140 may allow a user to order groceries from a grocery store. The user's order may specify which groceries they want delivered from the grocery store and the quantities of each of the groceries. The user's client device 100 transmits the user's order to the online system 140 and the online system 140 selects a picker to travel to the grocery source location to collect the groceries ordered by the user. Once the picker has collected the groceries ordered by the user, the picker delivers the groceries to a location transmitted to the picker client device 110 by the online system 140.

The model serving system 150 receives requests from the online system 140 to perform tasks using machine-learned models. The tasks include, but are not limited to, natural language processing (NLP) tasks, audio processing tasks, image processing tasks, video processing tasks, and the like. In one or more embodiments, the machine-learned models deployed by the model serving system 150 are language models configured to perform one or more NLP tasks. The NLP tasks include, but are not limited to, text generation, query processing, machine translation, chatbots, and the like. In one or more embodiments, a language model of the model serving system 150 is configured as a transformer neural network architecture (i.e., a transformer model). Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. The language model can be configured as any other appropriate architecture including, but not limited to, transformer-based networks, long short-term memory (LSTM) networks, Markov networks, BART, generative-adversarial networks (GAN), diffusion models (e.g., Diffusion-LM), and the like.

In one or more embodiments, the task for the model serving system 150 is based on knowledge of the online system 140 that is fed to the machine-learned model of the model serving system 150, rather than relying on general knowledge encoded in the model weights of the model. Thus, one objective may be to perform various types of queries on the external data in order to perform any task that the machine-learned model of the model serving system 150 could perform. For example, the task may be to perform question-answering, text summarization, text generation, and the like based on information contained in an external dataset.

Thus, in one or more embodiments, the online system 140 is connected to an interface system 160. The interface system 160 receives external data from the online system 140 and builds a structured index over the external data using, for example, another machine-learned language model or heuristics. The interface system 160 receives one or more queries from the online system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the online system 140 can generate a prompt using the external data as context, often times, the amount of information in the external data exceeds prompt size limitations configured by the machine-learned language model. The interface system 160 can resolve prompt size limitations by generating a structured index of the data and offers data connectors to external data sources.

The smart cart 170 is a cart (e.g., a shopping cart) with one or more sensors and a computing device. The one or more sensors may detect various information relating to the smart cart 170. The sensors may include cameras and/or load sensors coupled to the baskets of the smart cart 170. The cameras can capture image data of items obtained. The load sensors can capture load data indicating a load on each basket. Further example sensors include a scanner for scanning items that are placed into the smart cart 170, a location sensor for tracking a position of the smart cart 170 in the in-store environment, an inertial measurement unit (IMU) sensor for measuring movement data (e.g., translational velocity and/or acceleration, or rotational velocity and/or acceleration) as IMU data, etc. The computing device of the smart cart 170 processes the data captured by the sensors and, optionally, other data provided from other components of the system environment, e.g., the user client device 100, the picker client device 110, the source computing system 120, the online system 140, etc. The computing device can provide content to the user of the smart cart 170 during their store visit. The content may be generated by the smart cart 170 and/or other components of the system environment. The functionality of the smart cart 170 is further described in FIGS. 3-5.

In some examples, a user can use the smart cart 170 during a personal in-store visit. In such examples, the smart cart 170 may access a profile on the user, e.g., to retrieve relevant user preference data. The user could also provide a shopping list, such that the smart cart 170 can assist the user in filling the shopping list, e.g., like an order. As the user fills the smart cart 170 with items, the smart cart 170 may identify the added items. During the visit, the smart cart 170 may provide content to the user, e.g., generated by the online system 140 based on one or more predictions based on the captured sensor data, user data, contextual data, or some combination thereof. At the end of the visit, the smart cart 170 can aid the user in checking out.

In other examples, a picker can user the smart cart 170 to fulfill orders by users of the online system 140. In such examples, the smart cart 170 can perform functionality of the picker client device 110. The smart cart 170 may also generate and provide fulfillment instructions to assist the picker in fulfilling the batch of orders. In one or more embodiments, the smart cart 170 may also provide content to the picker, e.g., tasks to complete. Example tasks in relation to the smart cart 170 may include: charging the smart cart 170, calibrating the smart cart 170, repairing the smart cart 170, relocating the smart cart 170 to a service site, etc.

Figure 1B:
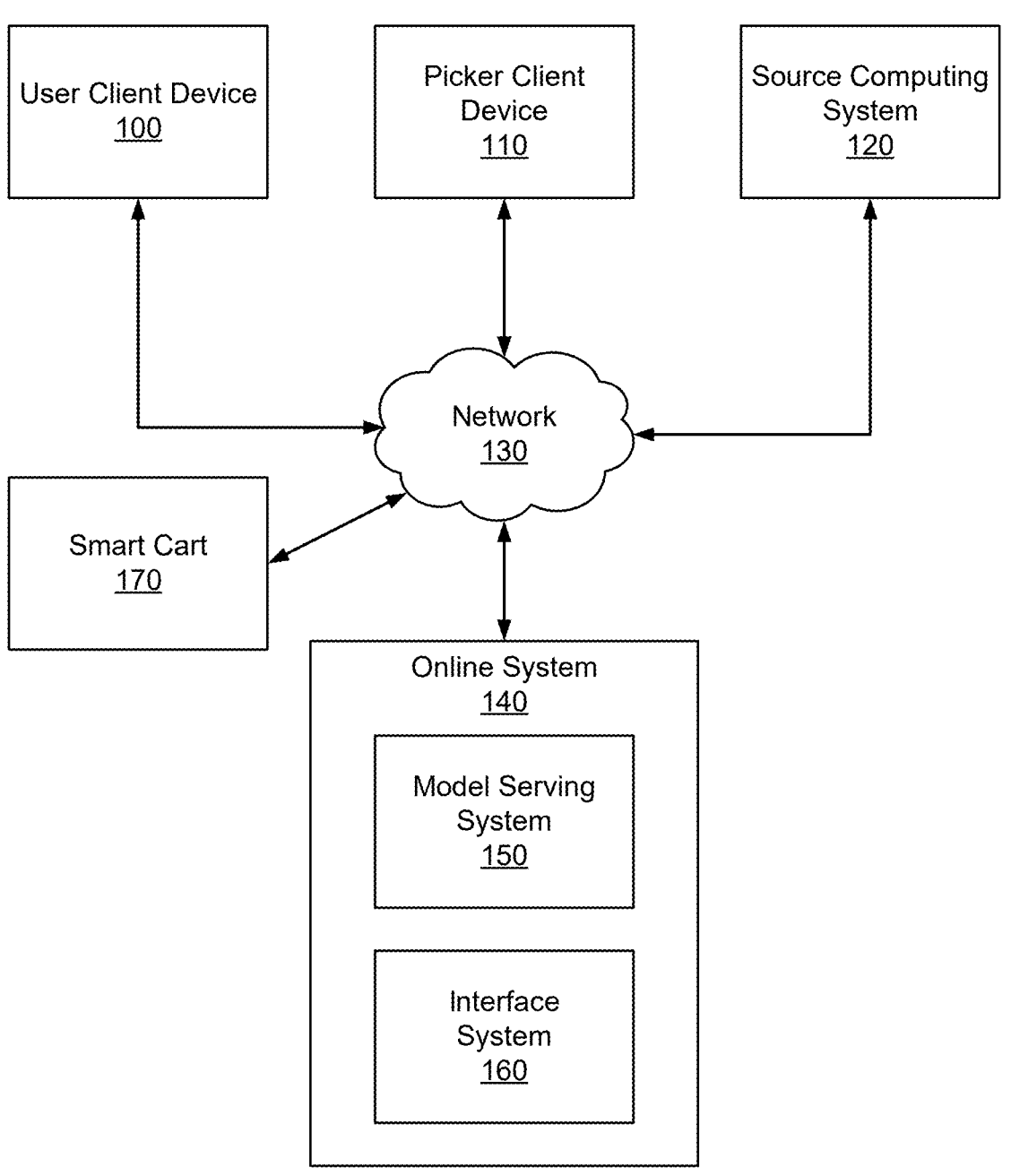
FIG. 1B illustrates an example system environment for an online system, in accordance with one or more embodiments.

FIG. 1B illustrates an example system environment for an online system 140, in accordance with one or more embodiments. The system environment illustrated in FIG. 1B includes a user client device 100, a picker client device 110, a source computing system 120, a network 130, an online system 140, and a smart cart 170. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online system 140. In one or more embodiments, as illustrated in the example system environment in FIG. 1B, the model serving system 150 and/or the interface system 160 is managed and deployed by the entity managing the online system 140. The online system 140 is described in further detail below with regards to FIG. 2.

Online System Architecture

Figure 2:
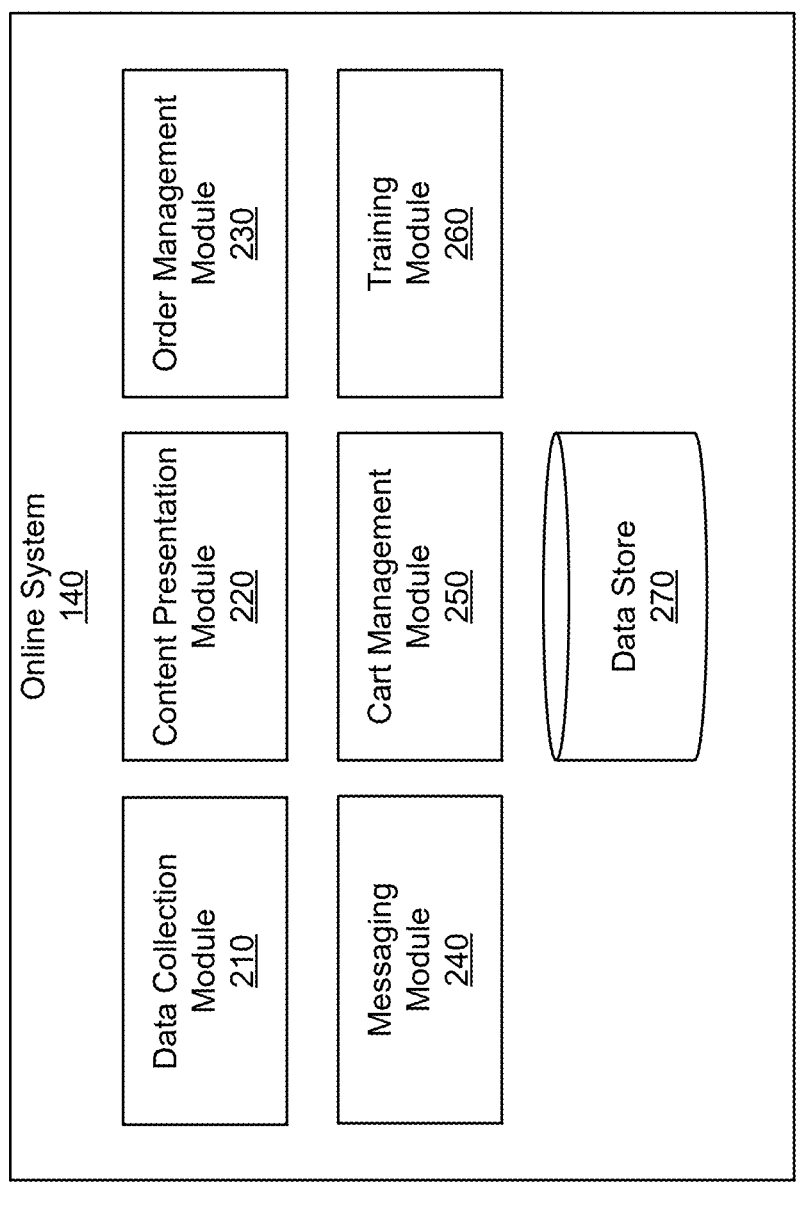
FIG. 2 illustrates an example system architecture for an online system, in accordance with one or more embodiments.

FIG. 2 illustrates an example system architecture for an online system 140, in accordance with some embodiments. The system architecture illustrated in FIG. 2 includes a data collection module 210, a content presentation module 220, an order management module 230, a messaging module 240, a cart management module 250, a training module 260, and a data store 270. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 210 collects data used by the online system 140 and stores the data in the data store 270. The data collection module 210 may only collect data describing a user if the user has previously explicitly consented to the online system 140 collecting data describing the user. Additionally, the data collection module 210 may encrypt all data, including sensitive or personal data, describing users.

For example, the data collection module 210 collects user data, which is information or data that describe characteristics of a user. For example, the data collection module 210 may collect a user's name, address, other demographic information (e.g., age range, family size, dietary restrictions or preferences, etc.), preferences (e.g., store visit frequency, order magnitude, etc.), previous orders, favorite items, favorite types of items, favorite stores, favorite pickers, repeat pickers, stored payment instruments, or some combination thereof. The user data also may include default settings established by the user, such as a default store/source location, payment instrument, delivery location, or delivery timeframe. The user data may also include user preference data indicating one or more preferences, e.g., provided by the user and/or inferred by the online system 140. The data collection module 210 may collect the user data from sensors on the user client device 100 or based on the user's interactions with the online system 140.

The data collection module 210 also collects item data, which is information or data that identifies and describes items that are available at a source location. The item data may include item identifiers for items that are available and may include quantities of items associated with each identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the dependability of items in source locations, also referred to as "dependability." For example, for each item-store combination (a particular item at a particular warehouse), the item data may include a time that the item was last found, a time that the item was last not found (a picker looked for the item but could not find it), the rate at which the item is found, or the popularity of the item. The data collection module 210 may collect item data from a source computing system 120, a picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 210 also collects picker data, which is information or data that describes characteristics of pickers. For example, the data collection module 210 may collect the picker's name, the picker's location, how often the picker has serviced orders for the online system 140, a user rating for the picker, a number of users that have favorited the picker, which stores the picker has collected items at, or the picker's previous shopping history. Additionally, the picker data may include preferences expressed by the picker, such as their preferred stores to collect items at, how far they are willing to travel to deliver items to a user, how many items they are willing to collect at a time, timeframes within which the picker is willing to service orders, payment information by which the picker is to be paid for servicing orders (e.g., a bank account), feedback from the picker in fulfilling user orders, etc. The data collection module 210 collects picker data from sensors of the picker client device 110 or from the picker's interactions with the online system 140.

Additionally, the data collection module 210 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

The content presentation module 220 selects content for presentation to a user. For example, the content presentation module 220 selects which items to present to a user while the user is placing an order and/or using a smart cart during an in-store visit.

In embodiments with the user placing an order, the content presentation module 220 generates and transmits an ordering interface for the user to order items. The content presentation module 220 populates the ordering interface with items that the user may select for adding to their order. In some embodiments, the content presentation module 220 presents a catalog of all items that are available to the user, which the user can browse to select items to order. The content presentation module 220 also may identify items that the user is most likely to order and present those items to the user. For example, the content presentation module 220 may score items and rank the items based on their scores. The content presentation module 220 displays the items with scores that exceed some threshold (e.g., the top n items or the p percentile of items).

In embodiments with the user using a smart cart during an in-store visit, the content presentation module 220 may generate and transmit a cart interface for presentation on the smart cart 170. In other embodiments, the smart cart 170 may generate the cart interface. The cart interface may provide details about the user and/or the in-store visit, a list of one or more items in the smart cart, one or more item recommendations, or some combination thereof. The content presentation module 220 may implement a recommendation model for determining one or more item recommendations for presentation in the cart interface. The content presentation module 220 may train the recommendation model as a machine-learning model, and, optionally, as a multimodal model. In one or more embodiments, the recommendation model may input a list of items in a smart cart 170, a location of the smart cart 170 in the in-store environment, items in the item database, other contextual data, or some combination thereof.

The content presentation module 220 may use a scoring function to score items for presentation to a user. The scoring function may score items for a user based on item data for the items and user data for the user. The scoring function may determine a ranking score based on ranking parameter values for each item and a weight vector. In some embodiments, an item selection model trained as a machine-learning model may determine a likelihood that the user will order the item. In some embodiments, the item selection model uses item embeddings describing items and user embeddings describing users to score items. These item embeddings and user embeddings may be generated by separate machine-learning models and may be stored in the data store 270.

The order management module 230 manages orders by users. The order management module 230 receives orders from a user client device 100 and assigns the orders to pickers for service based on picker data. For example, the order management module 230 assigns an order to a picker based on the picker's location and the location of the store from which the ordered items are to be collected. The order management module 230 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 230 determines when to assign an order to a picker based on a delivery timeframe requested by the user with the order. The order management module 230 computes an estimated amount of time that it would take for a picker to collect the items for an order and deliver the ordered items to the delivery location for the order. The order management module 230 assigns the order to a picker at a time such that, if the picker immediately services the order, the picker is likely to deliver the order at a time within the requested timeframe. Thus, when the order management module 230 receives an order, the order management module 230 may delay in assigning the order to a picker if the requested timeframe is far enough in the future (i.e., the picker may be assigned at a later time and is still predicted to meet the requested timeframe).

When the order management module 230 assigns an order to a picker, the order management module 230 transmits the order to the picker client device 110 associated with the picker, e.g., with the content presentation module 220. The order management module 230 may also transmit navigation instructions from the picker's current location to the source location associated with the order. If the order includes items to collect from multiple source locations, the order management module 230 identifies the source locations to the picker and may also specify a sequence in which the picker should visit the source locations.

The order management module 230 may track the location of the picker through the picker client device 110 to determine when the picker arrives at the source location. When the picker arrives at the source location, the order management module 230 transmits the order to the picker client device 110 for display to the picker. As the picker uses the picker client device 110 to collect items at the source location, the order management module 230 receives item identifiers for items that the picker has collected for the order. In some embodiments, the order management module 230 receives images of items from the picker client device 110 and applies computer-vision techniques to the images to identify the items depicted by the images. The order management module 230 may track the progress of the picker as the picker collects items for an order and may transmit progress updates to the user client device 100 that describe which items have been collected for the user's order.

The order management module 230 determines when the picker has collected all of the items for an order. For example, the order management module 230 may receive a message from the picker client device 110 indicating that all of the items for an order have been collected. Alternatively, the order management module 230 may receive item identifiers for items collected by the picker and determine when all of the items in an order have been collected. When the order management module 230 determines that the picker has completed an order, the order management module 230 transmits the delivery location for the order to the picker client device 110. The order management module 230 may also transmit navigation instructions to the picker client device 110 that specify how to travel from the source location to the delivery location, or to a subsequent source location for further item collection. The order management module 230 tracks the location of the picker as the picker travels to the delivery location for an order, and updates the user with the location of the picker so that the user can track the progress of the order. In some embodiments, the order management module 230 computes an estimated time of arrival of the picker at the delivery location and provides the estimated time of arrival to the user.

The order management module 230 coordinates payment by the user for the order. The order management module 230 uses payment information provided by the user (e.g., a credit card number or a bank account) to receive payment for the order. In some embodiments, the order management module 230 stores the payment information for use in subsequent orders by the user. The order management module 230 computes a total cost for the order and charges the user that cost. The order management module 230 may provide a portion of the total cost to the picker for servicing the order, and another portion of the total cost to the store. The order management module 230 may further provide an option to the user to provide a tip to the picker, e.g., for outstanding service.

The messaging module 240 facilitates communication between the user client device 100 and the picker client device 110. As noted above, a user may use a user client device 100 to send a message to the picker client device 110. The messaging module 240 receives the message from the user client device 100 and transmits the message to the picker client device 110 for presentation to the picker. The picker may use the picker client device 110 to send a message to the user client device 100 in a similar manner. Communications between the user and the picker may be provided to the content presentation module 220 in scoring items for a user.

The cart management module 250 manages the smart carts in use at a source location. In some embodiments, the cart management module 250 receives sensor data from the smart carts in use at the source location, external sensor data from other sensor systems tracking operation of the smart carts, or some combination thereof. The cart management module 250 may perform analyses on the data. In one or more embodiments, the cart management module 250 may analyze the sensor data to identify issues with operation of the smart cart. The cart management module 250 may apply a cart issue prediction model (e.g., trained as a machine-learning model) to the sensor data to identify the issues. In response to identifying operability issues, the cart management module 250 may trigger a remedial workflow to remedy the operability issues. The cart management module 250 may transmit command signal(s) to the smart cart (e.g., to remedy calibration errors with one or more of the sensors), may transmit remedial task(s) to a client device of a user of the smart cart (e.g., to perform follow-on diagnostic checks, or to modify operation of the smart cart), may transmit an issue report (e.g., for a technician to remedy an issue), may transmit a list of replacement parts to a source computing system (e.g., for automated ordering of the replacement parts). Following the remedial tasks, the cart management module 250 may receive additional sensor data from the smart cart (or other entities) to validate remediation of any identified issues. The cart management module 250 may store sensor logs for smart carts, any identified issues, service records in the data store 270.

In other embodiments, the cart management module 250 may analyze the sensor data to determine content for presentation to a user of the smart cart, e.g., via an electronic display on the smart cart. In some embodiments, the cart management module 250 may collect data from the smart carts, e.g., to train models implemented with the data. In such embodiments, the online system 140 may train the models, e.g., via the training module 260, and provide the trained models to the smart carts. In other embodiments, the models are stored at the online system 140. The smart cart 170 provides inputs to the models, and the online system 140 can return outputs by the models. The cart management module 250 may also provide any other data to the smart carts, e.g., information on users, user preference data, historical orders by users, information on items at the source locations, traffic flow of a source location, orders to be fulfilled, etc.

In other embodiments, the cart management module 250 tracks locations of the smart carts 170 in an in-store environment. In one or more embodiments, the cart management module 250 may work in conjunction with a cart tracking system, e.g., implemented by the store. The cart tracking system may provide a location of each smart cart 170 in the in-store environment to the cart management module 250. The cart management module 250 may map out the smart carts in the in-store environment, optionally logging information and other data relating to in-store visits. In other embodiments, the cart management module 250 may receive a location of each cart as self-tracked by the cart, e.g., with a location sensor.

The training module 260 trains machine-learning models used by the online system 140. For example, the training module 260 may train the item selection model, the cart issue prediction model, the query processing models, the models associated with the smart cart (described below in FIGS. 3-5), or any of the machine-learned models deployed by the model serving system 150. The online system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The training module 260 generates the set of parameters (e.g., the particular values of the parameters) for a machine-learning model by "training" the machine-learning model. Once trained, the machine-learning model uses the set of parameters to transform inputs into outputs.

The training module 260 trains a machine-learning model based on a set of training examples. Each training example includes input data to which the machine-learning model is applied to generate an output. For example, each training example may include user data, picker data, item data, or order data. In some cases, the training examples also include a label (e.g., ground truth) which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The training module 260 may apply an iterative process to train a machine-learning model whereby the training module 260 updates parameter values of the machine-learning model based on each of the set of training examples. The training examples may be processed together, individually, or in batches. To train a machine-learning model based on a training example, the training module 260 applies the machine-learning model to the input data in the training example to generate an output based on a current set of parameter values. The training module 260 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross-entropy loss function. The training module 260 updates the set of parameters for the machine-learning model based on the score generated by the loss function. For example, the training module 260 may apply gradient descent to update the set of parameters.

The data store 270 stores data used by the online system 140. For example, the data store 270 stores user data, store data, item data, order data, and picker data for use by the online system 140. The data store 270 also stores trained machine-learning models trained by the training module 260. For example, the data store 270 may store the set of parameters for a trained machine-learning model on one or more non-transitory, computer-readable media. The data store 270 uses computer-readable media to store data, and may use databases to organize the stored data.

With respect to the machine-learned models hosted by the model serving system 150, the machine-learned models may already be trained by a separate entity from the entity responsible for the online system 140. In one or more other embodiments, when the model serving system 150 is included in the online system 140, the training module 260 may further train parameters of the machine-learned model based on data specific to the online system 140 stored in the data store 270. As an example, the training module 260 may obtain a pre-trained transformer language model and further fine-tune the parameters of the transformer model using training data stored in the data store 270. The training module 260 may provide the model to the model serving system 150 for deployment.

Smart Cart

Figure 3:
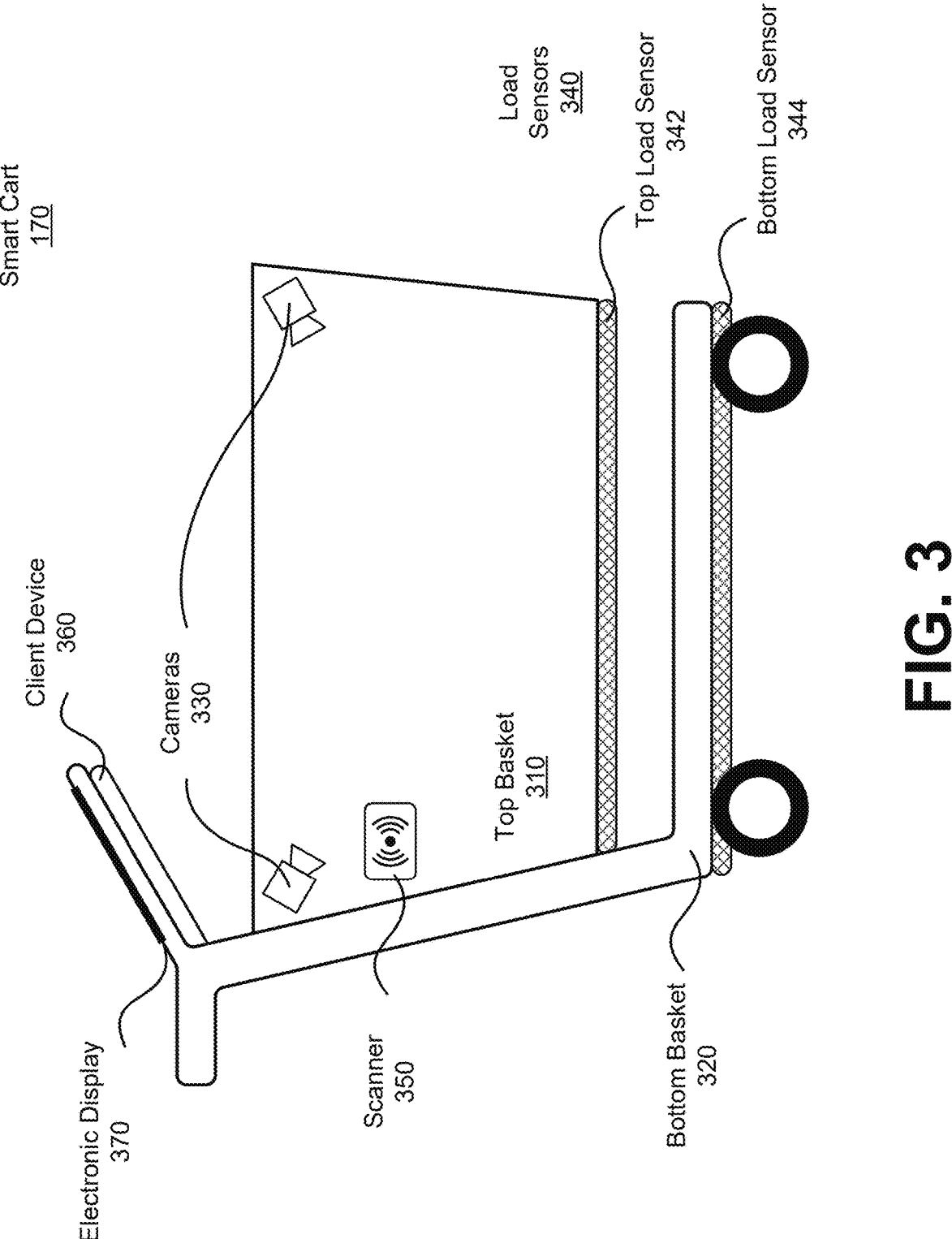
FIG. 3 illustrates a smart cart, in accordance with one or more embodiments.

FIG. 3 illustrates a smart cart 170, in accordance with some embodiments. The smart cart 170 may be operated by a user in a source location to obtain and purchase items listed for sale in the source location. In one or more embodiments, the smart cart 170 includes a top basket 310 and a bottom basket 320 atop a set of wheels. The smart cart 170 further comprises a plurality of cameras 330, load sensors 340, a scanner 350, a client device 360, and an electronic display 370. Alternative embodiments may include more, fewer, or different components from those illustrated in FIG. 3, and the functionality of each component may be divided between the components differently from the description below. For example, the smart cart 170 may further include other input and/or output devices, e.g., microphones or speakers. In other examples, the smart cart 170 may include a location sensor for tracking a location of the smart cart 170 within an in and around a source location. In yet other examples, the smart cart 170 may include different number of baskets, or each basket may be further subdivided into compartments, etc. Additionally, each component may perform their respective functionalities in response to a request from a human, or automatically without human intervention.

The baskets store items obtained by a user whilst traversing the source location and prior to checking out. As shown in FIG. 3, the baskets may include, e.g., a top basket 310 and a bottom basket 320. In other embodiments, there may be any other number of baskets. In additional embodiments, a basket may be subdivided into multiple compartments. In yet additional embodiments, the baskets may be disparately dimensioned, e.g., one basket may be shallow and positioned near the handle, whereas another basket may be deep and cylindrical for storing long skinny items.

The cameras 330 capture image data of an interior of the baskets. In general, the cameras 330 capture image data to identify and detect items placed in the smart cart 170. The captured image data may include photos or video. In the embodiment shown in FIG. 3, the cameras 330 are positioned internal facing for the top basket 310.

In other embodiments, each basket may include one or more of the cameras 330 positioned to identify and detect items placed in the respective baskets. In yet other embodiments, a subset of the baskets may include one or more cameras, whereas other baskets do not have dedicated cameras. In still other embodiments, cameras may be positioned to be in view of one or more baskets, i.e., having a field of view that encompasses the one or more baskets.

The load sensors 340 measure a weight of items placed in the baskets. Each load sensor generates load data indicating a measure of weight or mass of items placed in each respective basket over time. For example, the load data may be zeroed when the basket is emptied, and, when a user places a first item into the basket, the load sensor may record the change in load atop the load the sensor as the load data. The load data may be time series data of the total load, or change in load. In other embodiments, the load data may indicate a load per item placed into the smart cart 170 recorded at a particular timestamp during the in-store visit.

In one or more embodiments, each basket may be coupled to a load sensor. In other embodiments, a subset of baskets may be outfitted with load sensors, whereas others do not have dedicated load sensors. As shown in FIG. 3, there is a top load sensor 315 for the top basket 310 and a bottom load sensor 325 for the bottom basket 320. In some embodiments, a load sensor may include one or more load sensing devices, e.g., for sensing the loads on different portions of a basket.

In some embodiments, the smart cart 170 includes the scanner 350. In such embodiments, the scanner 350 may scan uniquely tagged items. The scanner 350 may record the entering of the uniquely tagged items as scan data. The scanner 350 scans a signature of each item placed in the smart cart 170. The signature is a unique identifier for each item, e.g., a barcode, a RFID signature, QR code, etc. The range of the scanner 350 may toggled to only detect items placed into the smart cart 170, while not registering nearby external items as entering the cart.

In one or more embodiments, the scanner 350 is a radio-frequency identification (RFID) scanner. Accordingly, items available at the source location are tagged with RFID chips. The RFID chips may use active emission and/or passive emission. To be an active emitter, the RFID chip includes a power source (e.g., a battery) that enables the RFID chip to emit a distinct radio-frequency signature. To be a passive emitter, the RFID chip does not have its own power source. Rather, the RFID chip receives power from the RFID scanner's electromagnetic waves, thereby inducing a current in the RFID chip's antenna.

In other embodiments, the scanner 350 may be a barcode scanner. In such embodiments, each item may be tagged with a barcode. The store system may log a database of items with corresponding barcodes, such that the scanner 350 may capture light reflected off the barcode to determine the unique barcode signature of the item. In one or more related embodiments, the scanner 350 may be a quick-response (QR) code scanner. Similar to the barcode scanner, each item is tagged with a QR code that is unique to the item. The scanner 350 captures an image of the QR code and compares the detected QR code to a database of QR codes associated with items to identify an item that has entered the smart cart 170.

In some embodiments, the smart cart 170 may include a location sensor for tracking of a position of the smart cart in the source location. For example, the location sensor may be BlueTooth enabled, RFID enabled, GPS enabled, etc. The location sensor may also include an accelerometer, an inertial measurement unit, a magnetometer, wheel sensors (e.g., a rotary encoder), etc. The location sensor can leverage such devices to determine the cart's position, the cart's wheel rotation, the cart's orientation, the cart's velocity, the cart's acceleration, etc. Other technologies for tracking may also be implemented. For example, the source location may be outfitted with a camera system to capture images of the smart carts as they traverse around the in-store environment.

In some embodiments, the smart cart 170 may include an audio sensor for capturing acoustic signals from the environment surrounding the smart cart 170. The audio sensor may be implemented in conjunction with the client device

360 or separately on the smart cart 170. The audio sensor captures the acoustic signals, which may be parsed to identify and recognize speech by the user of the smart cart 170. The speech of the user may be leveraged for vocal commands or other interactions with a virtual agent. The text for speech by the virtual agent may be generated by leveraging a chatbot, e.g., a large language model configured for natural language processing. The acoustic signals may also inform any anomalies in operation of the smart cart 170. For example, a screeching sound while the smart cart 170 is in motion may relate to a stuck wheel.

The client device 360 is an on-board computing device that analyzes the data captured by the smart cart 170. The client device 360 may perform functionality of the user client device 100 and the picker client device 110. In the context of a user utilizing the smart cart 170, the client device 360 may present content that would be presented to the user client device 100, e.g., content recommending various items. In the context of a picker utilizing the smart cart, the client device 360 may present content that would be presented to the picker client device 110, e.g., an order assigned to the picker and comprising a list of items and their positions in the source location. Accordingly, the client device 360 may be communicatively connected to an online system (e.g., the online system 140, via the network 130).

In general, the client device 360 analyzes the data captured by the smart cart 170 to determine content for the user of the smart cart 170. For example, the client device 360 may, based on sensor data, detect items obtained by the user and currently in the smart cart 170 (also referred to as "obtained items," or "items in cart"). In one or more embodiments, the item scan data includes a scanned item identifier. The client device 360 may look up the scanned item identifier, e.g., in an item catalog, to detect the item obtained. In some embodiments, to identify items obtained, the client device 360 may implement an item identification model that inputs sensor data associated with an item obtained (e.g., item scan data or image data). The item identification model may be trained as a machine-learning model to classify image data to detect the items obtained. The client device 360 may also track or receive a location of the smart cart 170 in the in-store environment. The client device 360 may also apply a recommendation model to the sensor data and/or the location of the smart cart 170 to determine one or more items to recommend to the user during the in-store visit (also referred to as "recommended items," or "item recommendations"). In some embodiments, the recommendation model further considers item information (e.g., stored by the online system 140) or other contextual data relating to the in-store visit (e.g., user data, in-store visit data, etc.). In some embodiments, the recommendation model may be locally stored on the client device 360. In other embodiments, the recommendation model is stored on an online system (e.g., the online system 140). In such embodiments, the client device 360 provides data to the online system which applies the recommendation model to return the recommended items. The client device 360 may further provide navigation instructions to obtaining the recommended items, which may be based on the cart's location and each recommended item's location.

The electronic display 370 provides an interface for a user of the smart cart 170. The electronic display 370 may be configured to provide content to a user and may also be configured to receive user input. The electronic display 370 may include other input and/or output devices, e.g., a microphone and/or a speaker. The electronic display 370 may be a component of the client device 360.

In one or more embodiments, the smart components of the smart cart 170 may be removably coupled to the cart. For example, the cameras 330, the load sensors 340, the scanner 350, other sensors, the client device 360, the electronic display 370, or some combination thereof may be removably coupled to the cart, i.e., to retrofit a non-smart cart with the smart components-transforming the non-smart cart into the smart cart 170.

Smart Cart Issue Prediction and Remedial Workflow

Figure 4:
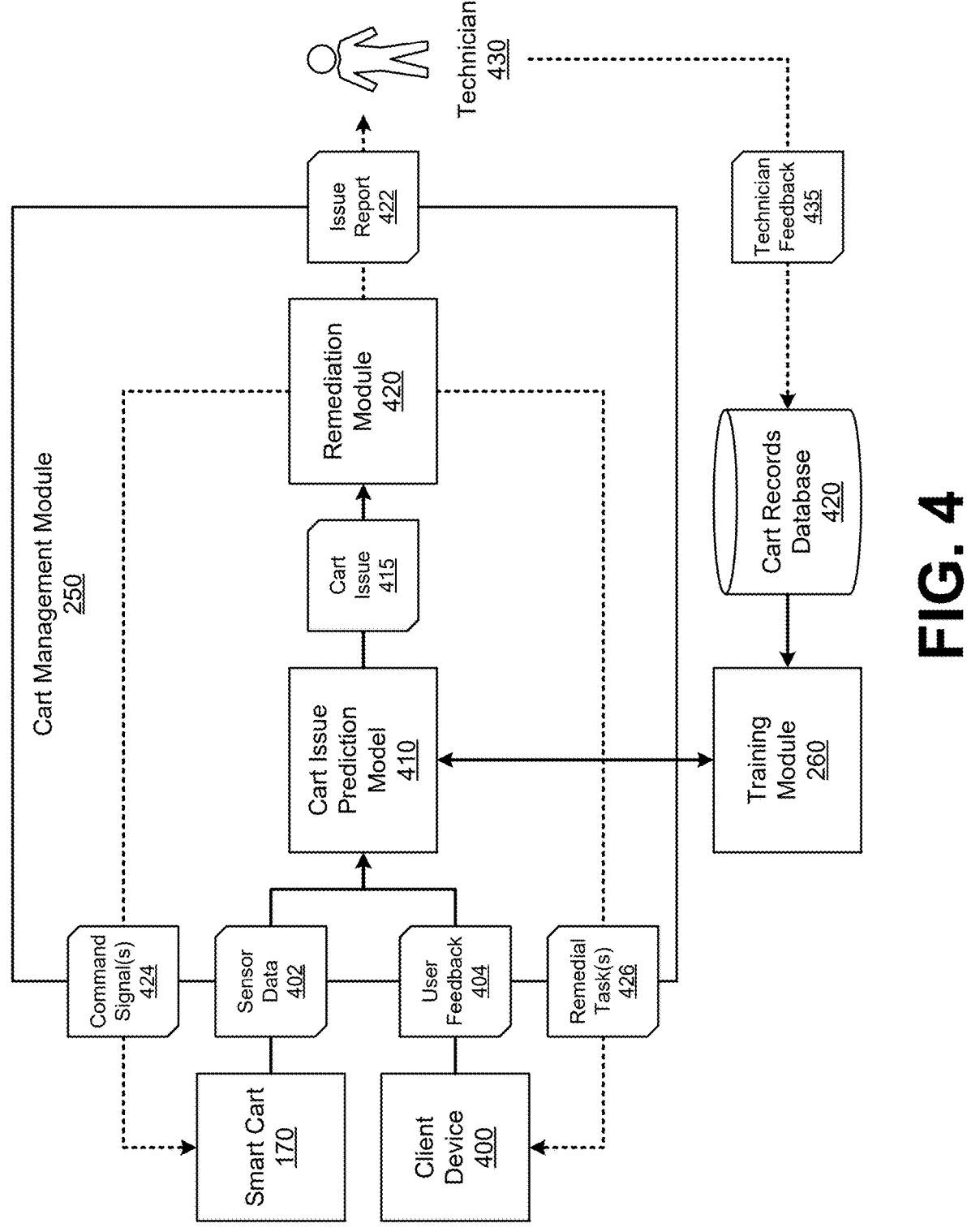
FIG. 4 is an illustrative workflow describing cart issue prediction and remediation, in accordance with one or more embodiments.

FIG. 4 is an illustrative flowchart describing smart cart issue prediction and a remedial workflow, in accordance with one or more embodiments. The description of FIG. 4 focuses on the interplay between the smart cart 170, a client device 400, the source computing system 120, and components of the online system 140 (in particular the cart management module 250).

The smart cart 170 captures sensor data 402 from the sensors on the smart cart 170. The sensors may include cameras, load sensors, item scanners, acoustic sensors, location sensors, or some combination thereof. The cameras may provide image data on items placed in the cart; the load sensors may provide load data on items placed in the cart; and the item scanner may provide item scan data. The item data may be stored locally on the smart cart 170 or on an online system (e.g., the online system 140). The acoustic sensors may capture acoustic signals from the environment of the smart cart 170. The location sensor may track the smart cart 170's location.

The client device 400 provides user feedback 404. In one or more embodiments, the client device 400 is the client device 360, i.e., a component of the smart cart 170. In other embodiments, the client device 400 is the user client device 100 or the picker client device 110. A user of the smart cart 170 may provide the user feedback 404 relating to operability of the smart cart 170, via the client device 400 to the online system. For example, the user feedback 404 may indicate an issue with the item scanner, indicating one or more items misidentified by the item scanner. As another example, the user feedback 404 may indicate cart mobility issues, e.g., difficulty pushing, difficulty turning, etc.

The cart management module 250 applies a cart issue prediction model 410 (e.g., trained as a machine-learning model) to the sensor data 402, the user feedback 404, or some combination thereof to identify one or more cart issues 415. In some embodiments, the cart issue prediction model 410 may be trained as a classifier to input the sensor data 402, the user feedback 404, or some combination thereof to predict likelihood of one or more cart issues 415. In some embodiments, the cart issue prediction model 410 may be trained as a large language model (LLM) configured to input a prompt including the sensor data 402, the user feedback 404, or some combination thereof to output a prediction of one or more cart issues 415. In other embodiments, the cart issue prediction model 410 may be a mixed machine-learning model combining one or more different types of machine-learning architecture. In one or more embodiments, the cart issue prediction model 410 may comprise a plurality of submodels. Each submodel may be a machine-learning model trained to predict likelihood of a type of cart issue.

In one or more embodiments, one submodel predicts a likelihood of a cart mobility issue. The submodel may be configured to input sensor data relating to movement of the cart, e.g., IMU data measured by an IMU sensor. The submodel may be trained as a machine-learning model to identify anomalous frequencies in the sensor data, e.g., the IMU data. The submodel may be trained with historical sessions of cart operation by other users. The historical sessions effectively serve as a distribution of the sensor data when cart operation is normal (i.e., issue free). As such, the submodel can identify when the sensor data is anomalous as compared to the distribution of sensor data during normal cart operation. In one or more embodiments, a sliding window may be leveraged to partition the sensor data (i.e., in a continuous timeseries) for input into the submodel. The output of the submodel may be a classification (e.g., normal or anomalous), a likelihood of anomalousness (or normality), or some combination thereof.

In some embodiments, the submodel takes frequencies from cart sensor data as an input and predicts a likelihood that the frequencies indicate an issue with the cart. The cart sensor data, e.g., IMU data, may indicate the position of the smart cart within the store. The online system may convert the sensor data to a set of frequencies representing the position of the smart cart. For example, the online system may apply a Fourier transform to the sensor data. In some embodiments, the online system filters out low frequencies from the sensor data before or after converting the sensor data to a set of frequencies. Thus, the online system generates a set of frequencies that represent shaking or other movement of the smart shopping cart while the cart is in use.

The online system may apply the submodel to the generated set of frequencies to predict whether an issue with the smart shopping cart is present. For example, the submodel may represent different distributions of the set of frequencies and the online system may use the distributions to identify a frequency that is outside of a range of values within the distribution (e.g., the amplitude of a frequency is some threshold number of standard deviations away from an average amplitude value for that frequency). Similarly, the submodel may apply weights to the set of frequencies to generate an overall score that represents the likelihood that there is an issue with the smart shopping cart. For example, the submodel may be a neural network that is trained to compute a score representing that likelihood based on training examples that comprise historical sensor data from smart shopping carts and labels indicating whether the historical sensor data in the training example indicates an issue with a smart shopping cart.

In one or more embodiments, one submodel may predict likelihood of a load sensor issue. The submodel may leverage items identified by other sensor data (e.g., item scan data or image data) to determine whether there is an issue with the load sensor. In such embodiments, the submodel may receive information describing the identified items (e.g., an item identification model may be leveraged to identify items based on the sensor data). Upon identifying an item, the cart issue prediction model 410 may obtain data describing characteristics of the item, including the item's known weight. The submodel may input the item's known weight and the load data attributable to the item when obtained by the user. The submodel may identify whether there is a discrepancy between the load data measured by the load sensor compared to the known weight information. In identifying the discrepancy, the submodel may further identify the calibration error of the load sensor, which may be used in calibrating the load sensor.

In one or more embodiments, one or more submodels may identify issues of miscalibration between different sensor types. For example, one such submodel can be configured to input wheel data (as measured by the one or more wheel sensors) and the IMU data (as measured by the IMU sensor). The wheel sensors may include one or more rotary encoders coupled to different placements on one or more of the wheels. The wheel sensors may also include one or more angular encoders for measuring a position of swivel joints coupling the wheels to the cart. The submodel may calculate, in parallel, movement information based on the wheel data and movement information based on the IMU data. The submodel may compare the two sets of movement information to identify whether there is concordance between the wheel sensors and the IMU sensor. If these sets of information differ (e.g., above a certain threshold), the submodel may identify an issue between the wheel sensors and the IMU sensor. In one example, the submodel may determine a direction of travel based on the IMU data and a direction of travel based on the angular encoders. The submodel compares the two directions against a threshold tolerance (e.g., 5°, 10°, 15°, etc.). If the two directions differ more than the threshold tolerance, the submodel may identify an issue in either the IMU sensor and/or the wheel sensors, e.g., a miscalibration between the sensor types. In another example, the submodel may determine a distance traveled based on the Imu data and a distance traveled based on the wheel rotation data. The submodel compares the two distances traveled against a threshold tolerance (e.g., within 5%, 10%, 15%, etc. difference) to identify issues in the IMU sensor and/or the wheel sensors.

In one or more embodiments, one submodel may identify miscellaneous issues based on user engagement with the smart cart. User engagement may be tracked based on the user's pushing of the smart cart, the user's interaction with digital components, etc. The submodel may ingest features relating to the user engagement to identify whether there is any issue with the smart cart. For example, the submodel could identify a general issue with the smart cart if the data relating to user engagement indicates the smart cart is getting swapped out with another smart cart. Or if the user is repeating certain actions because one or more components fail to react to the user's initial action, then the submodel may identify that there is an issue with such components.

Furthermore, a submodel may use, as a signal, whether a user stops using a smart shopping cart as a signal in determining whether the smart shopping cart has an issue. For example, the online system may determine, based on data from the smart shopping cart, that the user ended a session with the smart shopping cart without completing a transaction. A submodel may use this as a signal, along with sensor data, to predict that the smart shopping cart has an issue that leads to the user ending their interactions with the smart shopping cart.

In one or more embodiments, upon identification of any cart issues 415, the remediation module 420 may automatically trigger a remedial workflow to remedy the identified cart issues 415. In one or more embodiments, the remediation module 420 may store a database of workflows, with each workflow tailored to the type of cart issue 415 identified. If more than one cart issue 415 is identified, the remediation module 420 may combine workflows to generate a bespoke workflow tailored to addressing the smart cart 170's particular set of cart issues 415.

In one or more embodiments, actions in the remedial workflow may include generating and transmitting one or more command signals 424 to the smart cart 170 to remedy sensors or smart components. For example, the command signals 424 may instruct the client device and/or one or more sensors to reboot. The command signals 424 may further instruct the smart cart 170 to download one or more updates for the various smart components. As another example, the command signals 424 may instruct calibration of one or more sensors of the smart cart 170. For example, the command signals 424 may calibrate a rotary encoder coupled to a wheel of the smart cart 170. In such an example, the remediation module 420 may analyze the sensor data 402 to identify the calibration error in the rotary encoder. The remediation module 420 may compute the calibration error by comparing the rotary encoder data to other tracking data of the cart's location. The command signals may recalibrate the rotary encoder to align with the other tracking signals. In another example, the command signals 424 may calibrate the load sensor coupled to a basket of the smart cart 170. The remediation module 420 may leverage known weights of items to compute a calibration error in the load sensor. For example, a can of food may be known to weigh 8 ounces. The remediation module 420 may determine an error of –2 ounces if the load sensor of the smart cart 170 measures the can of food to be 6 ounces. The command signals 424 may calibrate the load sensor to calibrate that error.

The smart cart 170 may transmit a report indicating completion of the remedial tasks instructed in the command signals 424. In some embodiments, the smart cart 170 may perform one or more validation actions to validate remediation of the cart issues 415. The cart management module 250 may record the completed tasks instructed by the command signals 424, e.g., in a cart records database 420.

In one or more embodiments, actions in the remedial workflow may include generating and transmitting remedial tasks 426 to the client device 400 to instruct a user of the smart cart 170 to perform one or more modifications to operation of the smart cart 170 to remedy the identified cart issues 415. The remedial tasks 426 may be displayed on a user interface presented via an electronic display (e.g., the electronic display 370) of the smart cart 170, may be presented as audio content via one or more speakers, etc. Example remedial tasks include requesting the user to return the smart cart 170 to a charging station, removing an object stuck on the cart and impeding cart mobility, inspecting the smart cart 170 to identify new issues or to validate predicted issues, etc. The client device 400 may request user input confirming the completion of the remedial tasks 426. The client device 400 may provide the user input (e.g., in response to a query to inspect the cart or validate issues) and/or the user confirmation of completion of the remedial tasks 426 to the remediation module 420. In some embodiments, the training module 260 may leverage the user input received from the client device 400 as training examples to refine training of the cart issue prediction model 410.

In one or more embodiments, actions in the remedial workflow may include generating and transmitting an issue report 422 to a technician 430 for service. The remediation module 420 may prepare a report indicating the one or more cart issues 415. The remediation module 420 may generate the report to further indicate other records on the smart cart 170, e.g., including service records, cart operation records, etc. In some embodiments, the cart management module 250 provides the issue report 422 to the source computing system 120 to transmit to the technician 430. In one or more embodiments, the cart management module 250 automatically schedules a maintenance appointment for the smart cart 170. The technician 430 can provide technician feedback 435. The technician feedback 435 may indicate accuracy of the issues identified by the cart issue prediction model 410. The technician feedback may also indicate completion of service. The technician feedback 435 may be stored in the cart records database 420.

In one or more embodiments, the remediation module 420 may determine whether the smart cart 170 is still usable in light of the identified cart issues 415. If a cart is deemed unusable, the remediation module 420 may send command signals 424 to indicate inoperability of the smart cart 170 (e.g., command signals to power down the smart cart 170), may send remedial tasks 426 to remove the smart cart 170 from the in-store environment, etc.

In one or more embodiments, the training module 260 trains the cart issue prediction model 410 as a machine-learning model. In one or more embodiments, the training module 260 may obtain training data for training the cart issue prediction model based on data collected on the operation of the smart carts 170 during a prior period of time. The data may include sensor data, service records, user feedback on cart operation, etc. In one or more embodiments, the training module 260 may train the cart issue prediction model in an unsupervised manner using the sensor data to identify anomalies in cart operation. For example, the cart issue prediction model 410 may be trained to determine that, if a smart cart 170's acceleration data (e.g., captured via a tracking sensor) indicates more forceful starts and/or stops of the smart cart 170 compared to the majority of the fleet, the smart cart 170 may have a mobility issue. In one or more embodiments, the training module 260 may train the cart issue prediction model in a supervised manner, leveraging the service records to provide ground truth labels on cart issues identified by a technician or other user. In such embodiments, the training module 260 may leverage a language model to parse the service records to identify one or more cart issues diagnosed by the technician. The training module 260 may generate a training example with the identified cart issues, from the service records, and the sensor data and/or the user feedback data for the cart with identified issues.

In one or more embodiments, the training module 260 may leverage feedback to fine tune the cart issue prediction model 410. The training module 260 may generate training examples based on user input or feedback from a user of the smart cart 170, provided via the client device 400, or based on technician feedback 435 received from the technician 430. For example, the issue report 422 may indicate an issue with cart mobility. The technician feedback 435 may validate that prediction or invalidate it. If validated, the training module 260 may generate a positive training example, and, if invalidated, the training module 260 may generate a negative training example. The training module 260 fine tunes the cart issue prediction model 410 with the training example.

Example Methods

FIG. 5 method flowchart describing the process of cart issue prediction and/or remediation, in accordance with one or more embodiments. The description of FIG. 5 is in the perspective of an online system, but in other embodiments, any computing system or device may perform any, some, or all of the steps. For example, one or more of the steps may be performed by an online system (e.g., the online system 140).

The online system obtains 510 sensor data from sensors of a smart cart. Obtaining sensor data may include obtaining one or more types of sensor data including one or more of: wheel rotation data from one or more wheel sensors coupled to wheels of the smart cart, the wheel rotation data indicating rotation of the one or more wheels; item scan data from one or more item scanners in view of one or more baskets of the smart cart, the item scan data indicating one or more items corresponding to item identifies scanned by the item scanners; load data from one or more load sensors coupled to the one or more baskets of the smart cart, the load data indicating load on each basket over time; image data captured from one or more cameras in view of the one or more baskets of the smart cart; and inertial measurement unit (IMU) data from an IMU sensor coupled to the smart cart.

The online system may obtain 520 user feedback from a client device associated with the smart cart. The user feedback may indicate any issues with operation of the smart cart, in the opinion of the user. For example, the user may indicate issues with particular components of the smart cart (e.g., smart cart mobility was impacted, the touchscreen was not registering touches, etc.).

The online system inputs 530 sensor data and/or user feedback into a cart issue prediction machine-learning (ML) model to identify any cart issue(s) affecting cart operation. The cart issue prediction model is trained on historical data associated with past sessions of smart cart operation. The system obtains the historical sensor data for a fleet of smart carts operated in the in-store environment. The historical sensor data for each smart cart in the fleet is associated with a label indicating any identified anomalies in the operation of the smart cart. Such anomalies may be identified by technician reports when servicing the smart carts in the fleet. If there are no anomalies in the operation, the sensor data for that session may be labeled or associated with normal cart operation. If there are anomalies in the operation, then the sensor data may be labeled or associated with anomalous cart operation. The system trains the machine-learning model with the historical sensor data and the labels for the fleet of smart carts to identify anomalies in operation of a given smart cart based on the sensor data of the given smart cart. Training the cart issue prediction model may entail building a normal distribution for each type of sensor data based on the sensor data pertaining to that type of sensor data. Accordingly, the cart issue prediction model is trained to identify cart issues based on sensor data that is anomalous compared to the normal distributions.

In some embodiments, the cart issue prediction model includes a plurality of submodels, each being configured to identify one or more distinct issues. According to some embodiments, one submodel may identify issue(s) with an IMU sensor. The system applies the submodel to the IMU data to identify anomalous frequencies in the IMU data compared to IMU data from normal cart operation of the fleet of smart carts. The submodel can identify one or more issues with the operation of the smart cart based on the identified anomalous frequencies. According to some embodiments, one submodel identifies issue(s) with a load sensor, leveraging known weight information of items identified from other sensor data. The system uses other sensor data (e.g., item scan data and/or image data) to identify items obtained and placed in the smart cart. The system can obtain weight information on the identified items to compare against the load data. If there is an above threshold difference between the load data and the weight information on the items identified, the system may identify an issue with the load sensor. According to some embodiments, the system can compare movement data from different sensor types to identify issues. The system can determine movement of the smart cart based on the IMU data and, separately, movement of the smart cart based on the wheel data. The movement can include direction of travel and/or distance traveled. The system can compare the separately computed movements against a threshold tolerance. If the difference between the computed movements are above the threshold tolerance, the system can identify issues with either sensor type.

Upon identifying any cart issue(s), the online system 540 triggers a remedial workflow to address the identified cart issue(s). The remedial workflow may include any combination of the following steps.

In one or more embodiments of the remedial workflow, the online system generates 550 a command signal for the smart cart to modify operation of the smart cart. The system may identify a calibration error in a sensor of the smart cart, generate a command signal to calibrate the sensor of the smart cart, and transmit the command signal to the smart cart for calibration of the sensor. For example, if the system identifies that the load sensor is registering by under 2 pounds, the system may generate a command signal to recalibrate the load sensor according to the identified calibration error of 2 pounds. In other embodiments, the system may determine that the one or more issues render the smart cart inoperable. In response, the system generates and transmits a command signal to power down the smart cart.

In one or more embodiments of the remedial workflow, the online system generates 560 remedial tasks for the user of the smart cart to modify operation of the smart cart. The system may identify and transmit, i.e., to a client device of the smart cart, one or more remedial tasks instructing a user of the smart cart to perform; and transmitting the one or more remedial tasks for presentation to the user. For example, the remedial task may be to remove an obstruction of one or more wheels. Other remedial tasks may include: instructing the user to inspect the smart to verify presence of the one or more issues; instructing the user to modify operation of the smart cart; and instructing the user to relocate the smart cart to a service site in the in-store environment.

In one or more embodiments of the remedial workflow, the online system generates 570 an issue report for a technician including the identified cart issue(s). The system may further transmit a service appointment scheduling request to the technician with the issue report.

The online system received 580 a confirmation and/or feedback from the user and/or the technician. The feedback from the user may indicate validation or invalidation of the one or more issues predicted by the cart issue prediction model. The feedback may also be from a technician, e.g., in the instances where the technician is prompted to service the smart cart.

The online system may fine tune 590 the cart issue prediction ML model based on the confirmation and/or the feedback. To perform the fine tuning, the system generates additional training examples based on the feedback from the user and/or the technician. A positive example may indicate that the user and/or the technician validated the issue identified by the cart issue prediction model. A negative example may indicate the opposite, that the user and/or the technician invalidated the issue identified and, optionally, provided a corrected assessment of issue(s) with the smart cart. The system may leverage the additional training examples to retrain the machine-learning model to improve prediction accuracy.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor may comprise one or more subprocessing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed by a computer system comprising a processor and a non-transitory computer-readable medium, comprising:

obtaining sensor data from one or more sensors of a smart cart, wherein obtaining the sensor data comprises:

obtaining wheel rotation data from one or more wheel sensors coupled to wheels of the smart cart, the wheel rotation data indicating rotation of the one or more wheels, and obtaining inertial measurement unit (IMU) data from an IMU sensor coupled to the smart cart;

applying a cart issue prediction model trained as a machine-learning model to input the sensor data comprising the wheel rotation data and the IMU data and to identify one or more predicted issues with operation of the smart cart, wherein the cart issue prediction model is trained according to a process comprising:

obtaining historical sensor data for a fleet of smart carts operated in an in-store environment, wherein the historical sensor data comprises wheel rotation data captured by wheel sensors coupled to the fleet of smart carts and IMU data captured by IMU sensors coupled to the fleet of smart carts, and wherein the historical sensor data for each smart cart in the fleet is associated with a label indicating any anomalies in the operation of the smart cart, and training the machine-learning model with the historical sensor data and the labels for the fleet of smart carts to identify anomalies in operation of a given smart cart based on the sensor data of the given smart cart; and identifying the one or more predicted issues with the operation of the smart cart by the cart issue prediction model trained as the machine learning model;

receiving user input, via a client device, confirming that the smart cart is inoperable based on the one or more predicted issues with the operation of the smart cart;

responsive to the smart cart being inoperable, generating a command signal to power down the smart cart, and transmitting the command signal to the smart cart.

2. The method of claim 1, wherein obtaining the sensor data comprises obtaining one or more types of sensor data including one or more of: item scan data from one or more item scanners in view of one or more baskets of the smart cart, the item scan data indicating one or more items corresponding to item identifies scanned by the item scanners; load data from one or more load sensors coupled to the one or more baskets of the smart cart, the load data indicating load on each basket over time; or image data captured from one or more cameras in view of the one or more baskets of the smart cart.

3. The method of claim 2, wherein training the cart issue prediction model further comprises: building a normal distribution for each type of sensor data based on the sensor data pertaining to that type of sensor data, wherein the cart issue prediction model is trained to identify cart issues based on sensor data that is anomalous compared to the normal distributions.

4. The method of claim 1 further comprising: obtaining user feedback from a user of the smart cart relating to operation of the smart cart in the in-store environment, wherein applying the cart issue prediction model comprises applying the cart issue prediction model further to the user feedback to identify the one or more predicted issues with operation of the smart cart.

5. The method of claim 1, wherein training the cart issue prediction model further comprises: obtaining service records for the fleet of smart carts; identifying one or more issues in operation of the one or more smart carts in the fleet of smart carts; and generating training examples with the historical sensor data and the one or more issues identified from the service records; wherein training the cart issue prediction model comprises training the cart issue prediction model in a supervised manner with the training examples.

6. The method of claim 1, wherein applying the cart issue prediction model to the sensor data comprises applying a plurality of submodels to the sensor data to identify the one or more cart issues, wherein each submodel is trained to identify one type of cart issue.

7. The method of claim 1, wherein applying the cart issue prediction model comprises: applying one submodel to the IMU data to identify anomalous frequencies in the IMU data compared to IMU data from normal cart operation of the fleet of smart carts; and identifying one or more predicted issues with the operation of the smart cart based on the identified anomalous frequencies.

8. The method of claim 1, wherein obtaining the sensor data comprises: obtaining item scan data from one or more item scanners in view of one or more baskets of the smart cart, the item scan data indicating one or more items corresponding to item identifiers scanned by the item scanners, obtaining load data from one or more load sensors coupled to a storage area of the smart cart, the load data indicating a load on the storage area from the one or more items, and image data captured from one or more cameras depicting the one or more items in the storage area of the smart cart; and wherein applying the cart issue prediction model comprises: identifying an item placed in one basket of the smart cart based on the item scan data or the image data; identifying load of the item from the load data; retrieving weight information on the item placed in the one basket from a database storing characteristics of items; comparing the load of the item to the weight information on the item; and responsive to a difference between the load of the item and the weight information of the item being above a threshold, identifying a predicted issue with the load sensor.

9. The method of claim 1, wherein applying the cart issue prediction model comprises: applying one submodel to the wheel rotation data and the IMU data to identify a predicted issue with miscalibration of either the one or more wheel sensors or the IMU sensor.

10. The method of claim 1, further comprising: identifying a calibration error in a sensor of the smart cart; generating a command signal to calibrate the sensor of the smart cart; and transmitting the command signal to the smart cart for calibration of the sensor.

11. The method of claim 1, further comprising: identifying one or more remedial tasks instructing a user of the smart cart to perform; and transmitting the one or more remedial tasks to a client device of the smart cart for presentation to the user.

12. The method of claim 11, wherein identifying the one or more remedial tasks to instruct the user of the smart cart to perform comprises one or more of: identifying a first remedial task instructing the user to inspect the smart cart to verify presence of the one or more predicted issues; identifying a second remedial task instructing the user to modify operation of the smart cart; and identifying a third remedial task instructing the user to relocate the smart cart to a service site in the in-store environment.

13. The method of claim 1, further comprising: generating an issue report listing out the one or more predicted issues; and transmitting a service appointment scheduling request with the issue report.

14. The method of claim 1, further comprising: receiving feedback from a user validating or invalidating the one or more predicted issues; generating additional training examples based on the feedback; and fine tuning the machine-learning model based on the additional training examples.

15. A non-transitory computer-readable storage medium storing instructions that, when executed by a computer processor, cause the computer processor to perform operations comprising:

obtaining sensor data from one or more sensors of a smart cart, wherein obtaining the sensor data comprises: obtaining wheel rotation data from one or more wheel sensors coupled to wheels of the smart cart, the wheel rotation data indicating rotation of the one or more wheels, and obtaining inertial measurement unit (IMU) data from an IMU sensor coupled to the smart cart;

applying a cart issue prediction model trained as a machine-learning model to input the sensor data comprising the wheel rotation data and the IMU data and to identify one or more predicted issues with operation of the smart cart, wherein the cart issue prediction model is trained according to a process comprising: obtaining historical sensor data for a fleet of smart carts operated in an in-store environment, wherein the historical sensor data comprises wheel rotation data captured by wheel sensors coupled to the fleet of smart carts and IMU data captured by IMU sensors coupled to the fleet of smart carts, and wherein the historical sensor data for each smart cart in the fleet is associated with a label indicating any anomalies in the operation of the smart cart, and training the machine-learning model with the historical sensor data and the labels for the fleet of smart carts to identify anomalies in operation of a given smart cart based on the sensor data of the given smart cart; and identifying the one or more predicted issues with the operation of the smart cart by the cart issue prediction model trained as the machine learning model;

receiving user input, via a client device, confirming that the smart cart is inoperable based on the one or more predicted issues with the operation of the smart cart;

responsive to the smart cart being inoperable, generating a command signal to power down the smart cart; and transmitting the command signal to the smart cart.

16. The non-transitory computer-readable storage medium of claim 15, wherein applying the cart issue prediction model comprises: applying one submodel to the IMU data to identify anomalous frequencies in the IMU data compared to IMU data from normal cart operation of the fleet of smart carts; and identifying one or more predicted issues with the operation of the smart cart based on the identified anomalous frequencies.

17. The non-transitory computer-readable storage medium of claim 15, wherein obtaining the sensor data comprises: obtaining item scan data from one or more item scanners in view of one or more baskets of the smart cart, the item scan data indicating one or more items corresponding to item identifiers scanned by the item scanners, obtaining load data from one or more load sensors coupled to a storage area of the smart cart, the load data indicating a load on the storage area from the one or more items, and image data captured from one or more cameras depicting the one or more items in the storage area of the smart cart; and wherein applying the cart issue prediction model comprises: identifying an item placed in one basket of the smart cart based on the item scan data or the image data; identifying load of the item from the load data; retrieving weight information on the item placed in the one basket from a database storing characteristics of items; comparing the load of the item to the weight information on the item; and responsive to a difference between the load of the item and the weight information of the item being above a threshold, identifying a predicted issue with the load sensor.

18. The non-transitory computer-readable storage medium of claim 15, wherein applying the cart issue prediction model comprises: applying one submodel to the wheel rotation data and the IMU data to identify a predicted issue with miscalibration of either the one or more wheel sensors or the JIU sensor.

19. A system comprising: a computer processor; and a non-transitory computer-readable storage medium storing instructions that, when executed by the computer processor, cause the computer processor to perform operations comprising:

obtaining sensor data from one or more sensors of a smart cart, wherein obtaining the sensor data comprises: obtaining wheel rotation data from one or more wheel sensors coupled to wheels of the smart cart, the wheel rotation data indicating rotation of the one or more wheels, and obtaining inertial measurement unit (IMU) data from an IMU sensor coupled to the smart cart;

applying a cart issue prediction model trained as a machine-learning model to input the sensor data comprising the wheel rotation data and the IMU data and to identify one or more predicted issues with operation of the smart cart, wherein the cart issue prediction model is trained according to a process comprising: obtaining historical sensor data for a fleet of smart carts operated in an in-store environment, wherein the historical sensor data comprises wheel rotation data captured by wheel sensors coupled to the fleet of smart carts and IMU data captured by IMU sensors coupled to the fleet of smart carts, and wherein the historical sensor data for each smart cart in the fleet is associated with a label indicating any anomalies in the operation of the smart cart, and training the machine-learning model with the historical sensor data and the labels for the fleet of smart carts to identify anomalies in operation of a given smart cart based on the sensor data of the given smart cart;

identifying the one or more predicted issues with the operation of the smart cart by the cart issue prediction model trained as the machine learning model;

receiving user input, via a client device, confirming that the smart cart is inoperable based on the one or more predicted issues with the operation of the smart cart;

responsive to the smart cart being inoperable, generating a command signal to power down the smart cart; and transmitting the command signal to the smart cart.

* * * * *